No. 865,414. PATENTED SEPT. 10, 1907.
W. MAUVE.
STEAM BRAKE.
APPLICATION FILED MAY 17, 1907.
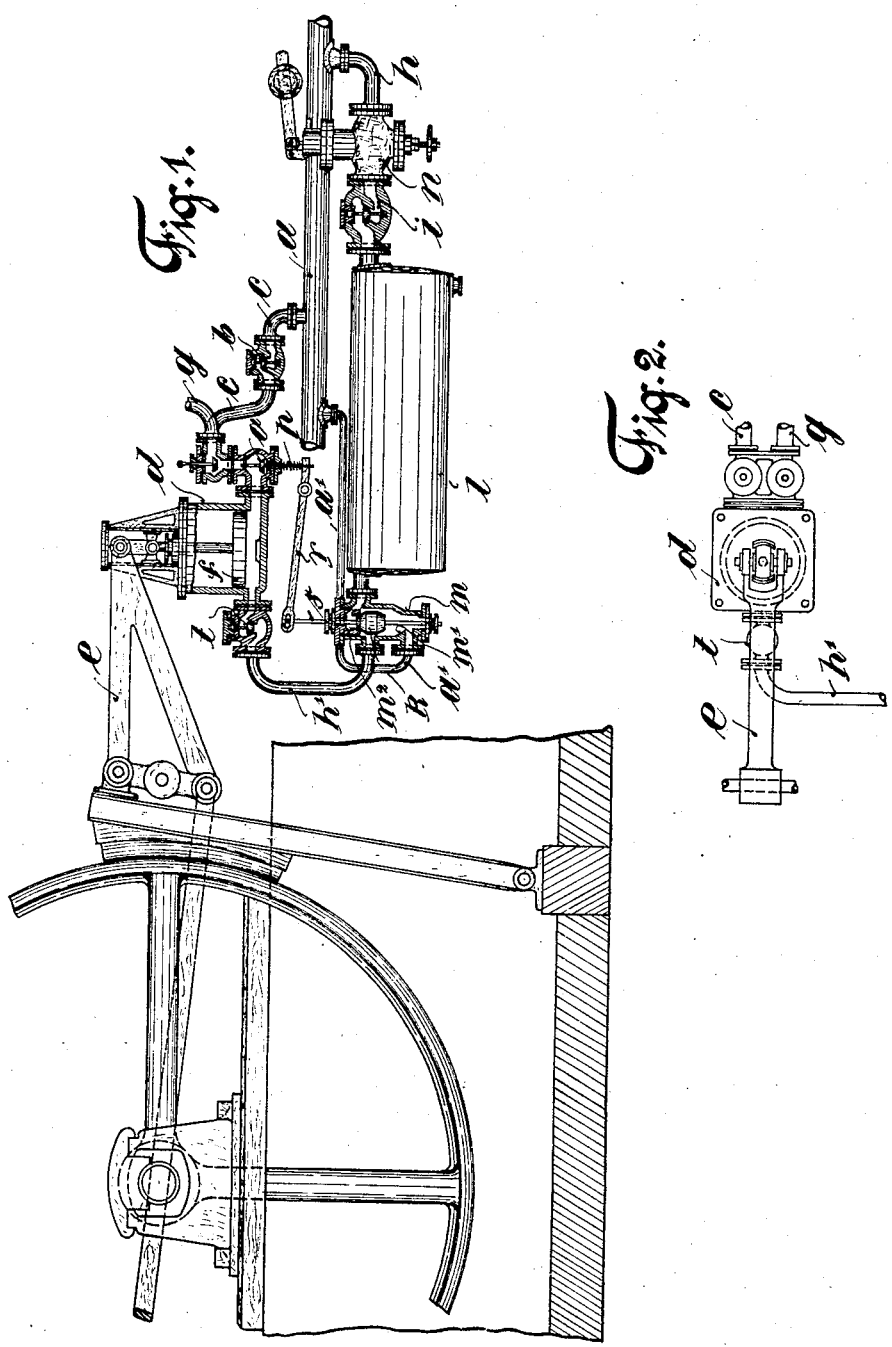
Witnesses
S. Ford
A. J. Hadden
Inventor
Waldemar Mauve
by his Attorney R. H. Hadden

UNITED STATES PATENT OFFICE.

WALDEMAR MAUVE, OF SOSNOWICE, RUSSIA.

STEAM-BRAKE.

No. 865,414.  Specification of Letters Patent.  Patented Sept. 10, 1907.

Application filed May 17, 1907. Serial No. 374,195.

*To all whom it may concern:*

Be it known that I, WALDEMAR MAUVE, a subject of the German Emperor, residing at Sosnowice, Russia, have invented a certain new and useful Improvement in Steam-Brakes, of which the following is a specification.

This invention relates to a safety device for use in connection with steam-brakes and adapted to act automatically in case the steam-pressure fails, in order to prevent the release of the brake.

A construction embodying the invention is illustrated in the annexed drawing, in which Figure 1 is a side-view, partly in section, and Fig. 2 a plan-view of part of the apparatus.

$a$ is the main steam pipe, from which steam flows through the anti-return valve $b$ and pipe $c$ to the piston cylinder $d$; after acting on the piston $f$ connected to the brake-lever $e$ this steam passes out through the pipe $g$. To prevent the release of the brake in case the steam-pressure should fail by reason of a pipe-burst, the boiler explosion or other accident, an auxiliary conduit $h$ $h'$ leads from the main pipe $a$ to the cylinder $d$, and comes into action if and when the pressure in the main pipe ceases. For this purpose the conduit $h$ $h'$ comprises a steam-drum $l$ having at its inlet orifice an anti-return valve $i$ and at its outlet orifice a double cone valve $k$, the latter being located in a box $m$. The orifice $m'$ adapted to be closed by the lower part of the valve $k$ communicates with the main steam-pipe $a$ by means of a pipe $a'$. The valve $k$ is, therefore, exposed to the pressure of the steam in the main-pipe and of the steam in the drum $l$, and if there is a difference of pressure the valve closes either the orifice $m'$ or an orifice $m^2$ at the upper part of the valve-box.

During normal working the pipe $h'$ leading to the piston cylinder is closed, that is to say the valve $k$ closes the orifice $m^2$. In order that this may be the case the pressure in the drum $l$ must be lower than the pressure in the main steam pipe, and for this purpose a pressure-reducing valve $n$ is provided in the part $h$ of the auxiliary conduit.

If from any cause the pressure in the main steam pipe is discontinued, so that pressure no longer acts in an upward direction on the valve $k$, the latter descends under the action of the pressure in the drum $l$, and thus admits steam from the latter to the pipe $h^1$ and at the same time closes the orifice $m^1$. This movement of the valve $k$ also serves to close a valve $o$ connected to the valve-spindle $s$ by a lever $r$ and rod $p$, and by this means the flow of steam from the cylinder $d$ to the discharge pipe $g$ is prevented. The steam which enters the cylinder therefore acts on the piston $f$ and keeps the brake applied.

An anti-return valve $t$ normally prevents the passage of steam from the cylinder to the pipe $h^1$.

The auxiliary conduit can also be supplied with fluid under pressure from a source other than the steam-pipe $a$, for example from an independent source of steam or from an air-compressor or the like, but the pressure in the drum $l$ must be lower than the normal pressure in the pipe $a$.

What I claim as my invention and desire to secure by Letters Patent of the United States is:—

A device for automatically preventing the release of steam-brakes in the case of accidental interruption of steam-pressure comprising in combination a main steam pipe, a piston cylinder an auxiliary conduit connected to the main steam pipe and piston cylinder, a steam drum in said auxiliary conduit, means for supplying said drum with steam at a lower pressure than the steam in the steam pipe, a double coned valve normally cutting off from said drum communication with the cylinder controlled by the steam in the main pipe and adapted to be operated by the pressure in the steam drum when the pressure in the main pipe is discontinued, so that said valve when so operated interrupts communication between the steam-drum and main pipe and opens communication between the drum and the cylinder and a lever actuated by said double coned valve to close a valve controlling the steam discharge pipe, so that the steam flowing from the auxiliary conduit into the cylinder actuates the brake operating piston.

In witness whereof I have signed this specification in the presence of two witnesses.

WALDEMAR MAUVE.

Witnesses:
SAML. KATZ,
ERNST BLEISCH.